US010828995B2

(12) United States Patent
Roth

(10) Patent No.: US 10,828,995 B2
(45) Date of Patent: Nov. 10, 2020

(54) ENERGY STORAGE SYSTEM AND METHOD FOR OPERATING AN ENERGY STORAGE SYSTEM

(71) Applicant: Dr. Ing. h.c. F. Porsche Aktiengesellschaft, Stuttgart (DE)

(72) Inventor: Martin Roth, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/789,273

(22) Filed: Jul. 1, 2015

(65) Prior Publication Data

US 2016/0001664 A1 Jan. 7, 2016

(30) Foreign Application Priority Data

Jul. 7, 2014 (DE) ........................ 10 2014 109 430

(51) Int. Cl.
| | | |
|---|---|---|
| *H02J 7/00* | (2006.01) | |
| *B60L 58/18* | (2019.01) | |
| *B60L 53/14* | (2019.01) | |
| *B60L 50/60* | (2019.01) | |

(Continued)

(52) U.S. Cl.
CPC ............... *B60L 53/14* (2019.02); *B60L 50/51* (2019.02); *B60L 50/66* (2019.02); *B60L 58/18* (2019.02); *B60L 58/19* (2019.02); *H02J 7/0024* (2013.01); *B60L 2220/42* (2013.01); *B60L 2260/28* (2013.01); *Y02T 10/646* (2013.01); *Y02T 10/7005* (2013.01); *Y02T 10/705* (2013.01);

(Continued)

(58) Field of Classification Search
CPC .......... H02J 7/0027; H02J 7/00; H02J 7/0013; H02J 7/007
See application file for complete search history.

(56) References Cited

U.S. PATENT DOCUMENTS

| | | | | |
|---|---|---|---|---|
| 2010/0282530 A1* | 11/2010 | Wang | ..................... | B60K 6/442 180/65.22 |
| 2011/0084658 A1* | 4/2011 | Yamamoto | .............. | B60L 5/005 320/108 |

(Continued)

FOREIGN PATENT DOCUMENTS

| | | | | |
|---|---|---|---|---|
| DE | 10 2007 030 542 | | 3/2008 | |
| DE | 102011010227 A1 * | | 8/2012 | .......... B60L 11/1816 |

(Continued)

OTHER PUBLICATIONS

Chinese Office Action dated Mar. 1, 2017.

*Primary Examiner* — Bickey Dhakal
(74) *Attorney, Agent, or Firm* — Gerald E. Hespos; Michael J. Porco; Matthew T. Hespos

(57) ABSTRACT

An energy storage system for a vehicle has at least first and second electric motors and first and second energy storage cells arranged in the vehicle In a traction mode the first energy storage cell is interconnected with the at least one first electric motor and the second energy storage cell is interconnected with the at least one second electric motor. In a charging mode the first and second energy storage cells are interconnected with a respectively dedicated charging device separately and independently of one another or the first and second energy storage cells are interconnected in series and with a common charging device.

8 Claims, 5 Drawing Sheets

(51) Int. Cl.
*B60L 58/19* (2019.01)
*B60L 50/51* (2019.01)

(52) U.S. Cl.
CPC ........ *Y02T 10/7055* (2013.01); *Y02T 10/7072* (2013.01); *Y02T 90/14* (2013.01)

(56) References Cited

U.S. PATENT DOCUMENTS

| | | | | |
|---|---|---|---|---|
| 2012/0074893 | A1* | 3/2012 | Cole | H02J 7/35 320/101 |
| 2013/0144476 | A1* | 6/2013 | Pinto | B60T 8/17555 701/22 |
| 2013/0193918 | A1* | 8/2013 | Sarkar | B60L 3/04 320/109 |
| 2014/0191720 | A1* | 7/2014 | Sugiyama | B60L 3/0069 320/109 |
| 2014/0347017 | A1* | 11/2014 | Sugano | B60L 1/003 320/137 |
| 2015/0258908 | A1* | 9/2015 | Fukui | B60L 3/00 320/162 |
| 2016/0114692 | A1* | 4/2016 | Tripathi | H02J 7/0021 320/109 |

FOREIGN PATENT DOCUMENTS

| | | | | |
|---|---|---|---|---|
| EP | 2337183 | | 6/2011 | |
| JP | H0614405 | A | 1/1994 | |
| JP | 2003116226 | A | 4/2003 | |
| JP | 2013258823 | A | 12/2003 | |
| JP | 2006187113 | A | 7/2006 | |
| JP | 2010226880 | A | 10/2010 | |
| JP | WO 2014021363 | A1 * | 2/2014 | ................ B60L 3/00 |
| WO | WO 2013084999 | A1 * | 6/2013 | .............. B60L 1/003 |
| WO | WO 2014196933 | A1 * | 12/2014 | ............ H02J 7/0021 |

\* cited by examiner

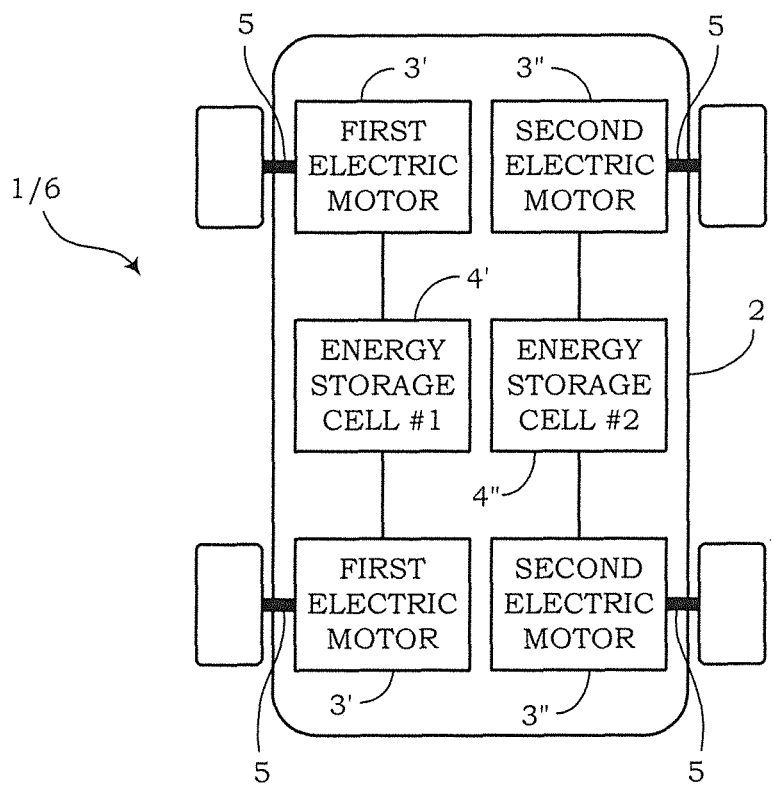
FIG. 1a
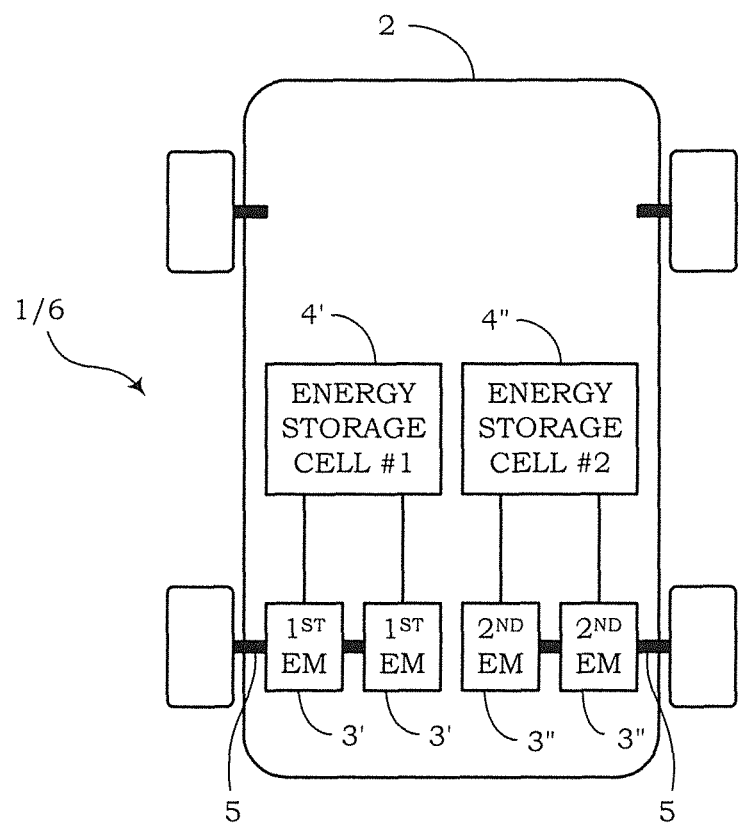

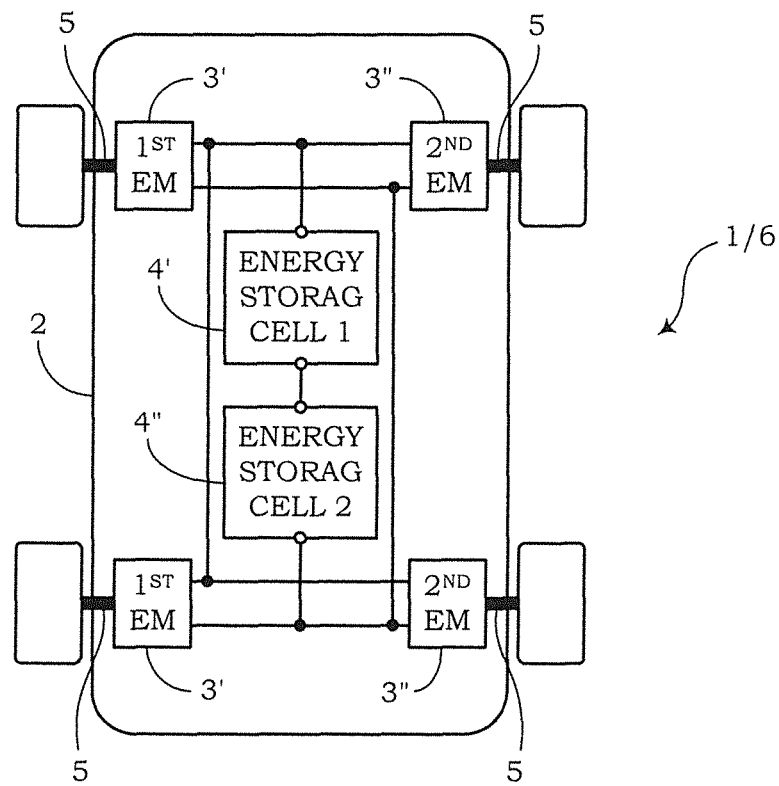
FIG. 2a
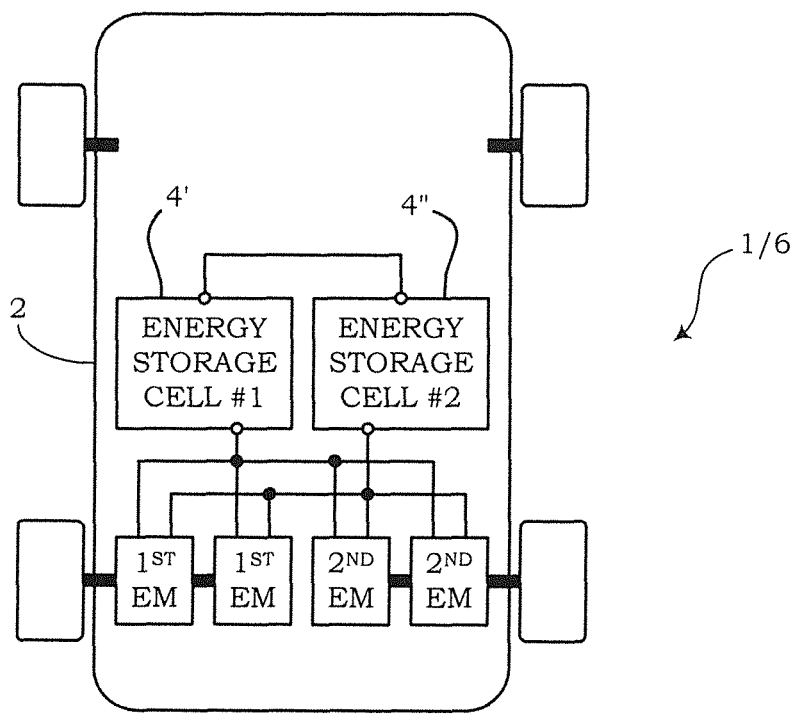

ENERGY STORAGE SYSTEM AND METHOD FOR OPERATING AN ENERGY STORAGE SYSTEM

CROSS REFERENCE TO RELATED APPLICATION

This application claims priority under 35 USC 119 to German Patent Appl. No. 10 2014 109 430.1 filed on Jul. 7, 2014, the entire disclosure of which is incorporated herein by reference.

BACKGROUND

1. Field of the Invention

The automotive sector is increasingly reliant on electric or hybrid vehicles that have electric motors that can be used as alternatives to internal combustion engines. Electric and hybrid vehicles have an energy store for supplying the electric motor with electrical energy. The energy store is a crucial factor with regard to the achievable driving performance and range. Rapid recharging of the energy store at an external charging station is indispensible for long distance journeys with such vehicles. Moreover, it is desirable to charge the energy store at different charging stations that may operate with different charging voltages.

DE 10 2007 030 542 A1 discloses a plug-in hybrid vehicle that has easily exchangeable battery modules. Changing the battery modules enables the battery capacity available in the vehicle to be adapted optimally to the required battery capacity calculated, for example, on the basis of the distance to be traveled purely electrically. In particular, fully charged battery modules are inserted into the vehicle when the battery modules are exchanged, thus avoiding a lengthy process of charging the battery modules in the vehicle, which is unusable during this time.

EP 2 335 183 A2 discloses a method for rapidly charging traction batteries at a charging station, wherein a plurality of external charging structures are used for charging a single traction battery to accelerate the charging process.

The object of the invention is to provide an energy storage system and a method for operating an energy storage system improves known prior art concepts for charging energy stores installed on the vehicle and allows faster and thus user-friendlier charging of the energy stores in the vehicle. An object of the invention is to provide an energy storage system to enable a variable and flexible adaptation of the vehicle-side charging and storage architecture to given charging infrastructures.

SUMMARY OF THE INVENTION

The invention relates to an energy storage system for a vehicle that has at least one first electric motor, at least one second electric motor, a first energy storage cell arranged in the vehicle and a second energy storage cell arranged in the vehicle. In a traction mode, the first energy storage cell is interconnected with the at least one first electric motor and the second energy storage cell is interconnected with the at least one second electric motor. However, in a charging mode the first and second energy storage cells are interconnected with a respectively dedicated charging device separately and independently of one another or the first and second energy storage cells are interconnected in series and with a common charging device.

The energy storage system of the invention has an advantage over the prior art in that the first and second energy storage cells are interconnected differently in the traction mode and in the charging mode. In this way, the two energy storage cells can either be separate from one another in the charging mode and in the traction mode, be charged independently of one another by two separate charging devices or be connected in series with one another and charged by a common charging device. Thus, each electric motor can be designed for a supply voltage that corresponds to the discharge voltage of the individual energy storage cells. During charging, in the first case, the charging currents advantageously are distributed between two separate charging devices and between two separate charging cables or charging regulators so that the charging time can be shortened. The charging voltage of the charging infrastructure can thus be identical to the charging voltages of the individual energy storage cells. In the second case, the charging voltage of the charging infrastructure can be increased or doubled in comparison with the first case, since a lower or half of the charging voltage is dropped in one of the two series-connected energy storage cells. The charging time, in turn, can be shortened as a result of the increase in or doubling of the charging voltage. Thus, it is possible to utilize a charging infrastructure having lower charging voltages by virtue of the two energy storage cells being charged separately from one another (first case), or to utilize a charging infrastructure having higher charging voltages by virtue of the two energy storage cells being connected in series (second case). The energy storage system according to the invention thus can be adapted flexibly to a given charging infrastructure. Control electronics in the form of a monitoring and control unit may choose between the first case and the second case depending on the present charging infrastructure and interconnects the energy storage cells accordingly. Alternatively, both variants may be available only in the production process and for the vehicle to be restricted permanently to one of the two charging possibilities before delivery to the customer.

The invention also relates to an energy storage system for a vehicle that has at least one electric motor. The energy storage system has first and second energy storage cells arranged in the vehicle. In a traction mode, the first and second energy storage cells are connected in series for supplying the at least one electric motor with electrical energy and in a charging mode the first and second energy storage cells are interconnected in parallel and with a common charging device.

The two energy storage cells of the energy storage system advantageously enables use of electric motors designed for higher or doubled supply voltages in comparison with the voltage of the energy storage cells, while a charging infrastructure designed for lower or halved voltages corresponding to each individual energy storage cell can be used for charging the energy storage cells. Thus, efficiency in the traction mode can be increased, and an existing charging infrastructure can be utilized.

The first electric motor can be provided for driving a first drive axle and the second electric motor can provided for driving a second drive axle. It is conceivable for a further first electric motor to be provided for driving the first drive axle or for driving a third drive axle, and for a further second electric motor to be provided for driving the second drive axle or for driving a fourth drive axle.

The first charging device may comprise a first cable running between the vehicle and a charging station, and the second charging device may comprise a second cable running between the vehicle and a charging station. Advantageously, the total charging current in the first case is thus distributed equally between both cables.

The first charging device may comprise a first charging regulator arranged on the vehicle side or on the charging station side, and the second charging device may comprise a second charging regulator arranged on the vehicle side or on the charging station side. An arrangement of the two charging regulators on the charging station side has the advantage that the charging regulators increase neither the weight nor the production costs of the vehicle. An arrangement of the two charging regulators on the vehicle side alternatively has the advantage that the charging regulators can be adapted individually to the two energy storage cells mounted in the vehicle.

The first energy storage cell and the second charging device may be connected in series with the common charging device in the charging mode. The common charging device may have a cable running between the vehicle and a charging station, and/or may have a common charging regulator arranged on the vehicle side or on the charging station side. In the second case, the series connection of the energy storage cells can double the charging voltage. Thus, a doubled charging current is avoided and a single cable suffices to achieve accelerated charging of the two energy storage cells.

The first and second energy storage cells may be connected together in the traction mode to form a common energy storage unit. Thus, the energy storage unit is connected electrically conductively to the at least one electric motor for supplying the at least one electric motor with electrical energy. The energy storage unit advantageously has double the voltage in comparison with the first and second energy storage cells.

In a further embodiment, first and second electric motors are arranged in the vehicle. The energy storage unit may be interconnected with both electric motors in the driving mode to supply both electric motors with electrical energy. The first electric motor may drive a first vehicle axle and the second electric motor may drive a second vehicle axle, or the first and second electric motors may drive a common vehicle axle. Electric motors that require a higher supply voltage advantageously can be used due to the series connection with of two energy storage cells.

The first energy storage cell and the second charging device may be connected in parallel with the common charging device in the charging mode. The common charging device may comprise a cable running between the vehicle and a charging station, and/or the common charging device may comprise a common charging regulator arranged on the vehicle side or on the charging station side.

The energy storage system may comprise a monitoring and control unit for—manually or automatically depending on a given charging infrastructure—interconnecting the first and second energy storage cells with the respectively dedicated charging device separately and independently of one another or interconnecting the first and second energy storage cells in parallel or in series with the common charging device. It is conceivable for the monitoring and control unit to be provided to the effect that in the charging mode the energy storage cells are interconnected automatically or by means of a corresponding user input in such a way that the fastest possible charging process is achievable with the given charging infrastructure.

The invention also relates to a method for operating the above-described energy storage system. In the traction mode, the method includes interconnecting the first energy storage cell with the at least one first electric motor and interconnecting the second energy storage cell with the at least one second electric motor, and in the charging mode, the method includes interconnecting the first and second energy storage cells with a respectively dedicated charging device separately and independently of one another or interconnecting the first and second energy storage cells in series and with a common charging device.

The method may further include connecting the first and second energy storage cells in series in the traction mode for supplying the at least one electric motor with electrical energy, and interconnecting the first and second energy storage cells in parallel and with a common charging device when in the charging mode.

Further details, features and advantages of the invention are evident from the drawings and also from the following description of preferred embodiments with reference to the drawings. In this case, the drawings merely illustrate exemplary embodiments of the invention which do not restrict the essential concept of the invention.

BRIEF DESCRIPTION OF THE DRAWINGS

FIGS. 1a and 1b show schematic views of an energy storage system in accordance with an exemplary first embodiment of the present invention.

FIGS. 2a and 2b show schematic views of an energy storage system in accordance with an exemplary second embodiment of the present invention.

DETAILED DESCRIPTION

Figure 1B:
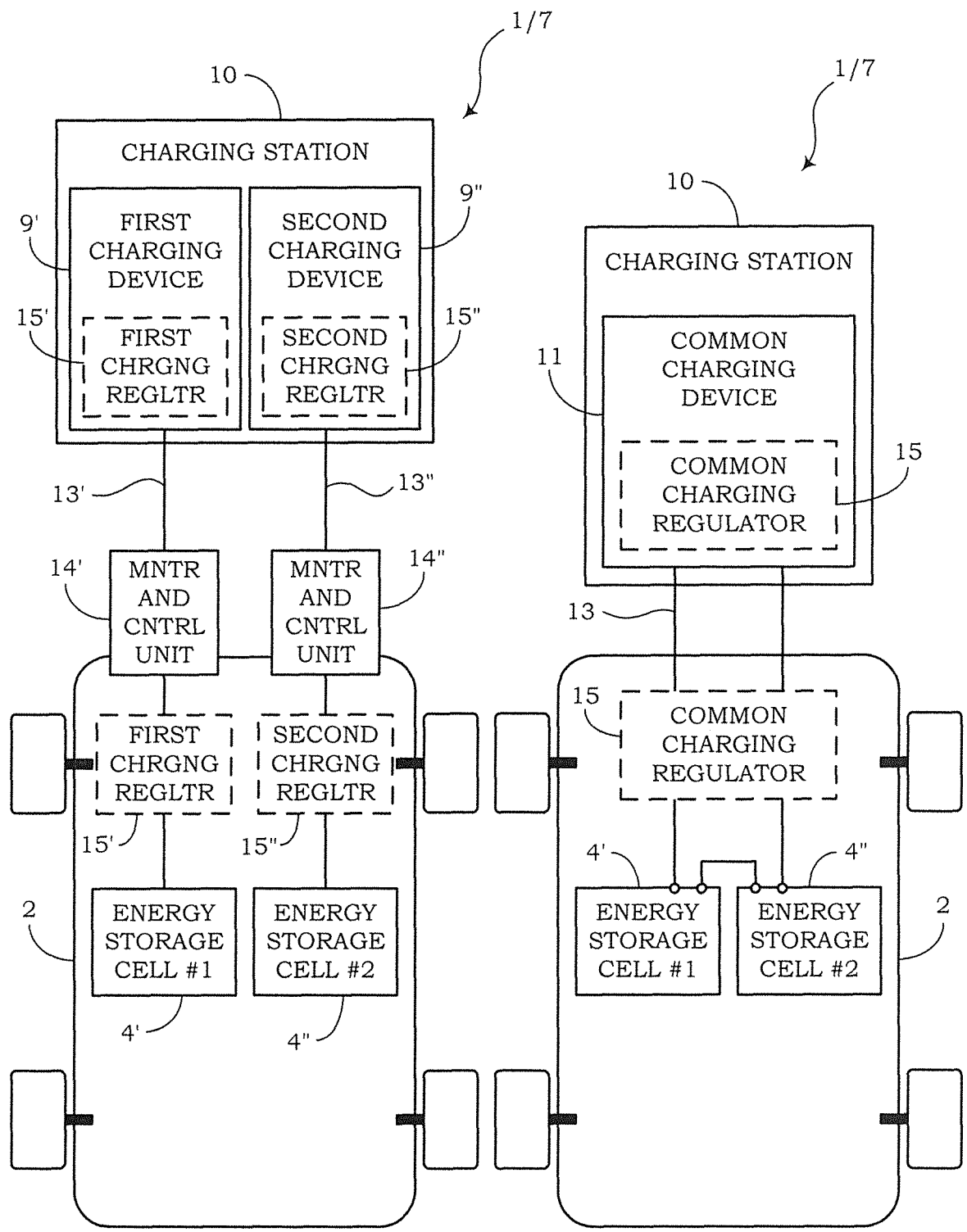

FIG. 1a schematically illustrates an energy storage system 1 in accordance with a first embodiment of the invention and shows two different configurations that can be realized in the traction mode 6 with the energy storage system 1.

The illustration at the top of FIG. 1a schematically depicts a motor vehicle 2 with all-wheel drive. The motor vehicle 2 has an electric motor 3 at each of its four axles 5. In this first configuration, the two electric motors 3 on the left side of the vehicle are designated as two first electric motors 3', while the two electric motors 3 on the right side of the vehicle are designated as two second electric motors 3". The energy storage system 1 has energy storage cells 4. In a traction mode 6, the two first electric motors 3' are supplied with electrical energy by a first energy storage cell 4', while the two second electric motors 3" are supplied with electrical energy by a second energy storage cell 4". It can be discerned from the depiction at the top of FIG. 1a that the first and second energy storage cells 4', 4" are electrically connected totally independently of one another and directly with the associated electric motors 3', 3". The discharge voltages of the two energy storage cells 4', 4" substantially correspond to the supply voltages of the electric motors 3', 3".

In this example, each energy storage cells 4', 4" is a 400 volt traction battery, such as a lithium-ion rechargeable battery. Each electric motor 3', 3" thus is designed for a supply voltage of 400 volts. Alternatively, the electric motors 3', 3" are designed for operation with AC voltage and also comprise a respective power electronics unit or inverter. Additionally, each electric motor 3', 3" can comprise a transmission. For simplification, reference only is made to electric motors 3', 3" hereinafter.

The bottom illustration in FIG. 1a shows that the traction mode 6 also can be used in a configuration in which only the front or rear axles of the motor vehicle 2 are driven. In this configuration, the first energy storage cell 4' supplies two first electric motors 3' that drive the same axle 5 on the left side of the vehicle. The second energy storage cell 4" supplies the two second electric motors 3" that drive the same axle 5 on the right side of the vehicle.

Each of the two energy storage cells 4', 4" is a 400-volt traction battery, such as a lithium-ion rechargeable battery. Each electric motors 3', 3" thus is designed for a supply voltage of 400 volts.

FIG. 1b illustrates the energy storage system 1 of the first embodiment in the charging mode 7. For the charging mode 7, it is unimportant whether a vehicle 2 with all-wheel drive in accordance with the first configuration or a vehicle 2 with only front- or rear-wheel drive in accordance with the second configuration is provided in the traction mode 6.

In the charging mode 7, the first and second energy storage cells 4', 4" can be interconnected differently to utilize different charging infrastructures for charging the first and second energy storage cells 4', 4".

If the motor vehicle 2 is to be charged at a charging station 10 with a 400-volt charging infrastructure, the two energy storage cells 4', 4" are connected to the corresponding charging station 10 separately and independently of one another by separate charging devices 9', 9", as in the left illustration in FIG. 1b. A charging voltage of substantially 400 volts thus is applied to both energy storage cells 4', 4". Each of the separate first and second charging devices 9', 9" comprises a dedicated charging cable 13', 13" and also a dedicated charging regulator 15', 15" arranged on the vehicle side or on the charging station side.

Alternatively, if the vehicle 2 is to be charged at a charging station 10 with an 800-volt charging infrastructure, the two energy storage cells 4', 4" are connected in series and connected to the charging station 10 via a common charging device 11. Consequently, half of the 800-volt charging voltage is dropped at each of the two energy storage cells 4', 4", so that each energy storage cell 4', 4" is charged with substantially 400-volt charging voltage. The common charging device 11 has a charging cable 13 and a dedicated charging regulator 15 on the vehicle or on the charging station.

The vehicle 2 comprises a monitoring and control unit that selects and implements the interconnection of the first and second energy storage cells 4', 4" in the charging mode 7 depending on the charging infrastructure (400 or 800 volts). However, a vehicle 2 could be designed for only one of the two charging infrastructures (400 or 800 volts) and changeover by a monitoring and control unit may not be possible.

FIG. 2a schematically illustrates an energy storage system 1 in accordance with a second embodiment of the invention. FIG. 2a shows two different configurations that can be realized in the traction mode 6 with the energy storage system 1, namely, a vehicle 2 with all-wheel drive in accordance with the top illustration in FIG. 2a and a vehicle 2 with only front- or rear-wheel drive in accordance with the bottom illustration in FIG. 2a.

The energy storage system 1 of the second embodiment is substantially the same as the energy storage system 1 of the first embodiment. However, the first and second energy storage cells 4', 4" of the second embodiment are interconnected with one another in series in the traction mode 6 to form a common energy storage unit. The common energy storage unit accordingly supplies a discharge voltage that is double the discharge voltage of each energy storage cell 4', 4". In this way, electric motors 3', 3" that operate with higher or doubled supply voltages can be used in the vehicle 2. In this embodiment, the common energy storage unit supplies the required electrical energy for both the first electric motors 3' arranged on the left side of the vehicle and for the second electric motors 3" arranged on the right side of the vehicle.

Each energy storage cell 4', 4" is a 400-volt traction battery, such as a lithium-ion rechargeable battery. In contrast to the first embodiment, the two electric motors 3', 3" are designed in each case for a supply voltage of 800 volts.

Figure 2B:
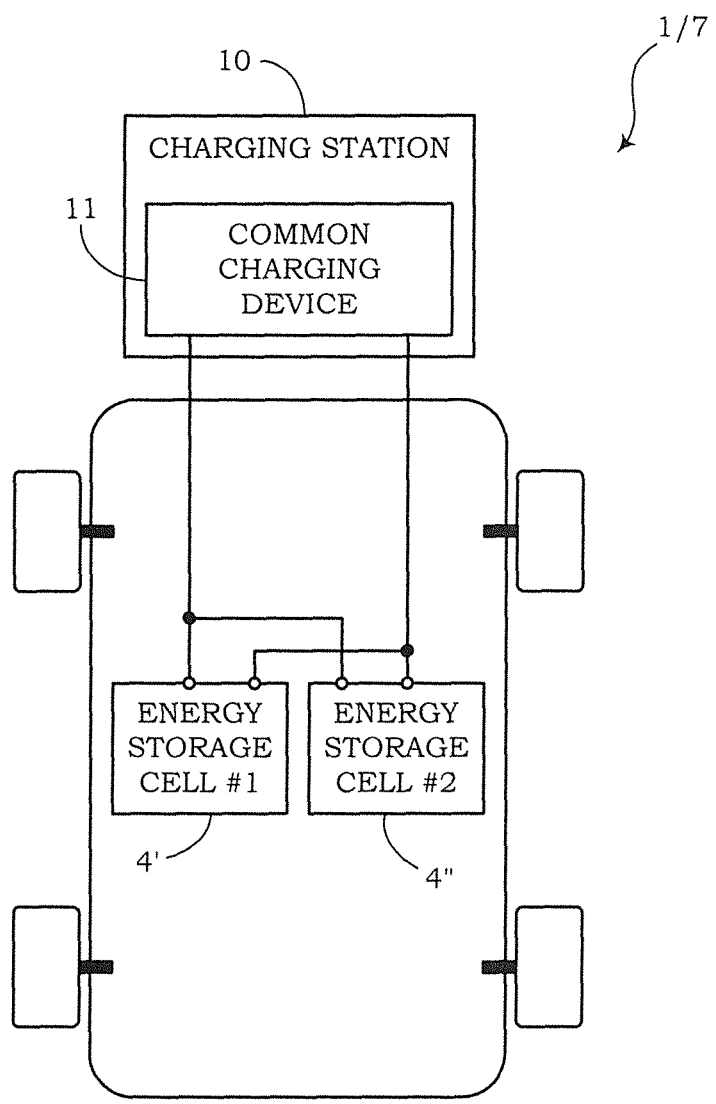

FIG. 2b illustrates the energy storage system 1 of the second embodiment in the charging mode 7. In the charging mode the first and second energy storage cells 4', 4" are connected in parallel both with one another and with the charging station 10. In this way, the energy storage cells 4', 4" can be charged by a charging station 10 that provides only a 400-volt charging infrastructure, even though the electric motors are designed for a supply voltage of 800 volts.

Figure 3A:
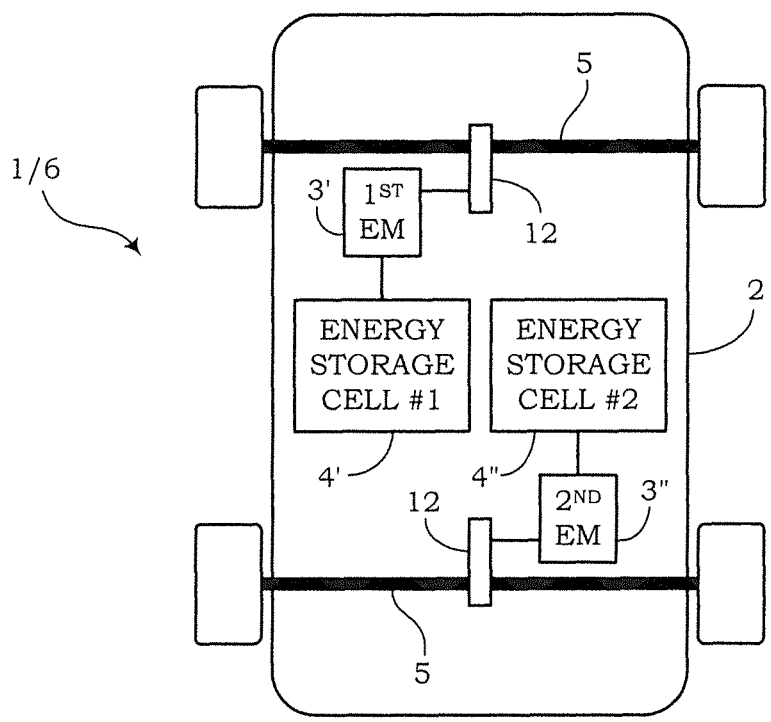
FIGS. 3a and 3b show schematic views of an energy storage system in accordance with an exemplary third and fourth embodiment of the present invention.

FIG. 3a schematically illustrates an energy storage system 1 in accordance with a third embodiment of the invention. The third embodiment is similar to the all-wheel drive configuration of the first embodiment on the left side of FIG. 1a.

A vehicle 2 with all-wheel drive is depicted schematically, the two drive axles 5 of which are in each case coupled to an electric motor 3 via a differential 12. In this first configuration, the electric motor 3 at one drive axle 5 is designated as first electric motor 3', while the electric motor 3 at the other drive axle 5 is designated as second electric motor 3". In a traction mode 6 of the energy storage system 1, the first electric motor 3' is supplied with electrical energy by a first energy storage cell 4', while the second electric motor 3" is supplied with electrical energy by a second energy storage cell 4". In this case, the first and second energy storage cells 4', 4" are interconnected totally independently of one another and directly with the associated electric motors 3', 3". In this case, the discharge voltages of the two energy storage cells 4', 4" substantially correspond to the supply voltages of the electric motors 3', 3".

Figure 3B:
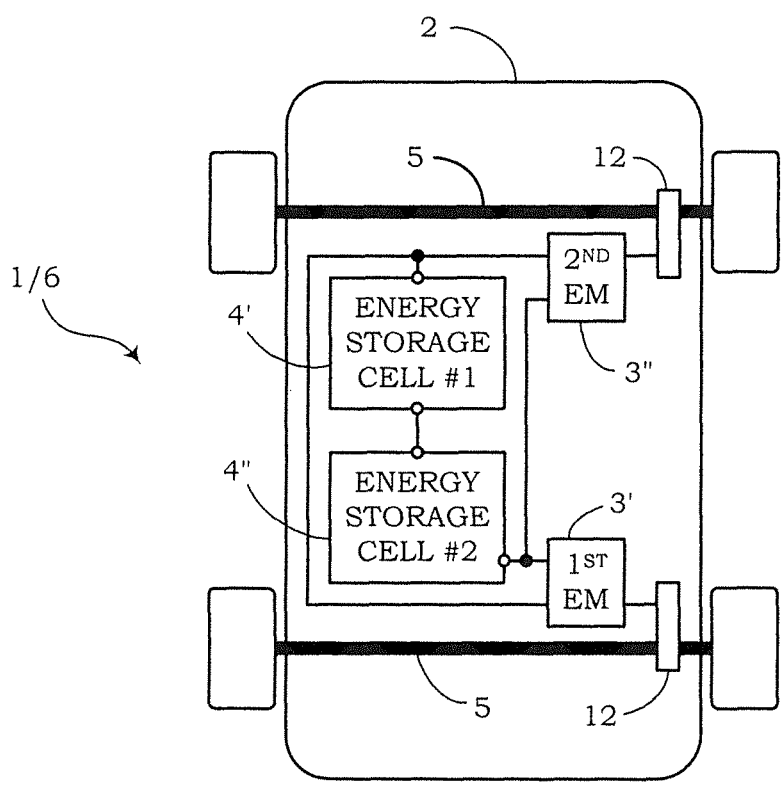

FIG. 3b schematically illustrates an energy storage system 1 of a fourth embodiment of the invention. The fourth embodiment is similar to the all-wheel drive configuration of the second embodiment as shown at the top of FIG. 2a.

The first and second energy storage cells 4', 4" are interconnected with one another in series in the traction mode to form a common energy storage unit. The common energy storage unit accordingly supplies a discharge voltage corresponding to the doubled discharge voltage of each energy storage cell 4', 4". In this way, electric motors 3', 3" that operate with higher or the double supply voltages can be used in the vehicle 2. In this embodiment, the common energy storage unit supplies the required electrical energy both for the first electric motor 3' assigned to the front axle and for the second electric motor 3" assigned to the rear axle (first configuration).

What is claimed is:

1. An energy storage system for a motor vehicle having a first electric motor and a second electric motor, the energy storage system comprising:
    first and second energy storage cells arranged in the motor vehicle;
    electrical connections between the first and second electric motors and the first and second energy storage cells, the electrical connections being configured so that, in a traction mode, the first energy storage cell is connected electrically with the first electric motor and the second energy storage cell is connected electrically with the second electric motor, the first and second electric motors being configured for driving at least one axle of the motor vehicle; and a monitoring and control unit that is configured so that the first and second energy storage cells can be charged at:
- a first charging station that has first and second dedicated charging devices that are separate and independent of one another and that are provided respectively with first and second cables running between the first and second charging devices and the motor vehicle so that the first charging device charges the first energy storage cell and so that the second charging device charges the second energy storage cell; and
- a second charging station that has a single charging device with a single cable running between the single charging device and the motor vehicle so that the single charging device charges both the first and second energy storage cells, wherein the monitoring and control unit further configured to determine a charging infrastructure when in a charging mode and then depending on the determined charging infrastructure:

disconnects the first energy storage cell from the second energy storage cell to accommodate a charging infrastructure at the first charging station, connects the first and second energy storage cells in series to accommodate a charging infrastructure at the second charging station supplying a first predetermined charging voltage, and connects the first and second energy storage cells in parallel to accommodate a charging infrastructure at the second charging station supplying a second predetermined charging voltage.

2. The energy storage system of claim 1, wherein, in the charging mode, the first energy storage cell is coupled to a first charging device and the second energy storage cell is coupled to a second charging device that is separate from the first charging device.

3. The energy storage system of claim 2, wherein the first charging device comprises the first cable running between the motor vehicle and the charging station, and wherein the second charging device comprises the second cable running between the motor vehicle and the charging station.

4. The energy storage system of claim 2, wherein the first charging device comprises a first charging regulator arranged on the charging station and wherein the second charging device comprises a second charging regulator arranged on the charging station.

5. The energy storage system of claim 2, wherein the first charging device comprises a first charging regulator arranged on the motor vehicle and wherein the second charging device comprises a second charging regulator arranged on the motor vehicle.

6. A method for operating the energy storage system of claim 1, the method comprising the steps of:
establishing the traction mode by electrically connecting the first energy storage cell with the at least one first electric motor and electrically connecting the second energy storage cell with the at least one second electric motor, and subsequently terminating the traction mode; and establishing the charging mode by electrically connecting the first and second energy storage cells with respectively first and second charging devices of the first charging station or electrically connecting the first and second energy storage cells in series with the single charging device of the second charging station.

7. The method of claim 6, further comprising depending on the determined charging infrastructure, manually or automatically electrically connecting the first and second energy storage cells with the respectively dedicated charging device separately and independently of one another, or electrically connecting the first and second energy storage cells in series with the common charging device.

8. The energy storage system of claim 1, wherein the second predetermined charging voltage is half of the first predetermined charging voltage.

* * * * *